United States Patent
Leeper et al.

(10) Patent No.: US 10,773,169 B2
(45) Date of Patent: Sep. 15, 2020

(54) PROVIDING MULTIPLAYER AUGMENTED REALITY EXPERIENCES

(71) Applicant: Google LLC, Mountain View, CA (US)

(72) Inventors: Adam Leeper, Mountain View, CA (US); John Ullman, Belmont, CA (US); Cheng Yang, Mountain View, CA (US); Peter Tan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 15/876,819

(22) Filed: Jan. 22, 2018

(65) Prior Publication Data
US 2019/0224572 A1    Jul. 25, 2019

(51) Int. Cl.
| | | |
|---|---|---|
| *A63F 13/65* | (2014.01) | |
| *G06F 3/01* | (2006.01) | |
| *G06K 9/32* | (2006.01) | |
| *G06K 9/00* | (2006.01) | |
| *G06F 3/0481* | (2013.01) | |
| *A63F 13/213* | (2014.01) | |
| *G06T 19/00* | (2011.01) | |
| *H04L 29/06* | (2006.01) | |

(52) U.S. Cl.
CPC .......... *A63F 13/65* (2014.09); *A63F 13/213* (2014.09); *G06F 3/011* (2013.01); *G06F 3/04815* (2013.01); *G06K 9/00671* (2013.01); *G06K 9/32* (2013.01); *G06T 19/006* (2013.01); *H04L 67/38* (2013.01); *A63F 2300/8082* (2013.01); *G06K 2009/3225* (2013.01)

(58) Field of Classification Search
CPC ......... A63F 13/65; A63F 13/213; G06F 15/16
See application file for complete search history.

(56) References Cited

U.S. PATENT DOCUMENTS

| | | | | |
|---|---|---|---|---|
| 8,717,294 B2* | 5/2014 | Weising | ................ | G09G 5/08 345/158 |
| 2010/0287485 A1* | 11/2010 | Bertolami | ............... | G06F 3/011 715/764 |

FOREIGN PATENT DOCUMENTS

DE    202017104653 U1    12/2017

OTHER PUBLICATIONS

International Search Report and Written Opinion for International Application No. PCT/US2019/012055, dated Mar. 21, 2019, 14 pages.

* cited by examiner

*Primary Examiner* — James S. McClellan
(74) *Attorney, Agent, or Firm* — Brake Hughes Bellermann LLP

(57) ABSTRACT

Systems and methods are described for providing co-presence in an augmented reality environment. The method may include controlling a first and second computing device to detect at least one plane associated with a scene of the augmented reality environment generated for a physical space, receiving, from the first computing device, a first selection of a first location within the scene and a first selection of a second location within the scene, generating a first reference marker corresponding to the first location and generating a second reference marker corresponding to the second location, receiving, from a second computing device, a second selection of the first location within the scene and a second selection of the second location within the scene, generating a reference frame and providing the reference frame to the first computing device and to the second computing device to establish co-presence in the augmented reality environment.

20 Claims, 11 Drawing Sheets

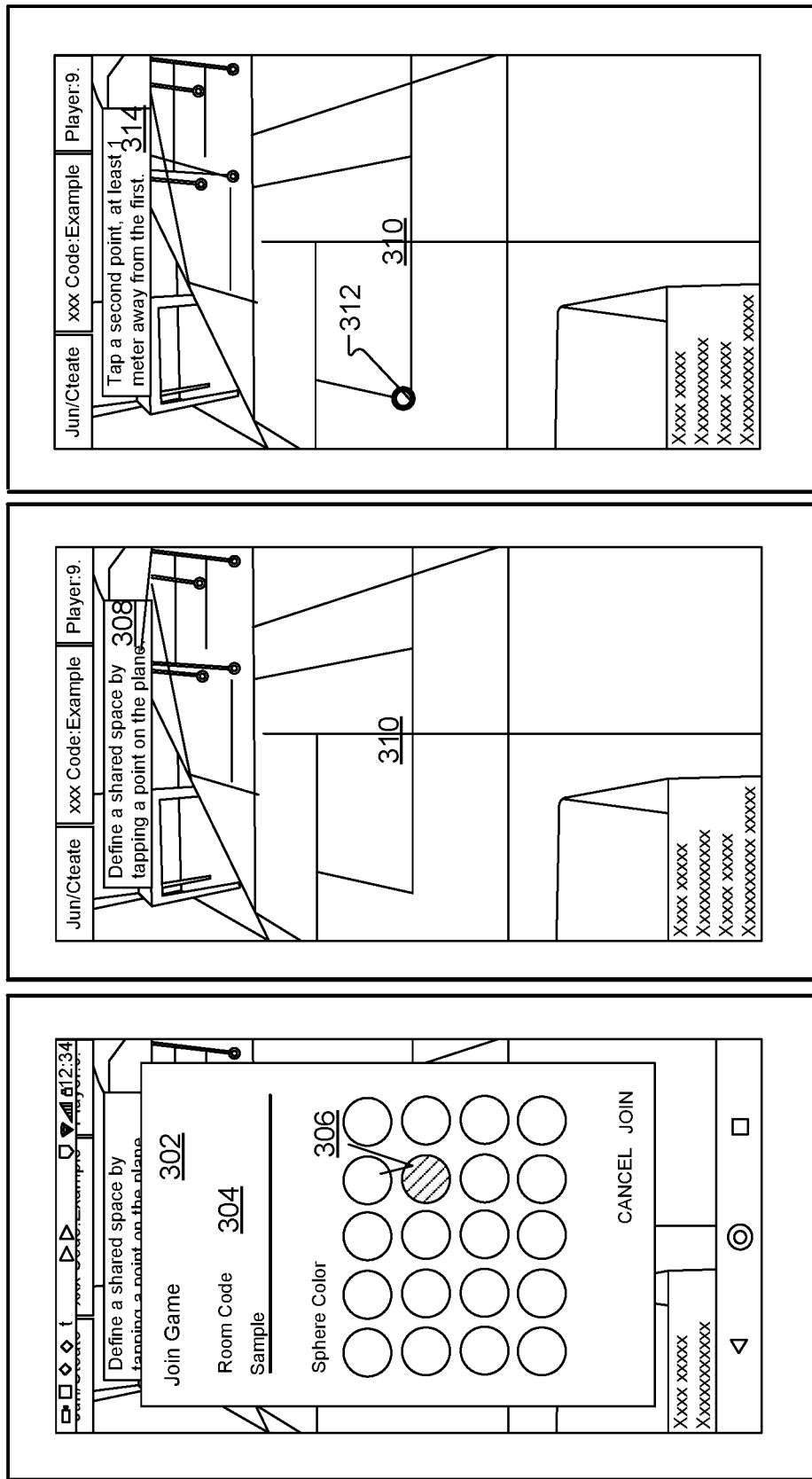

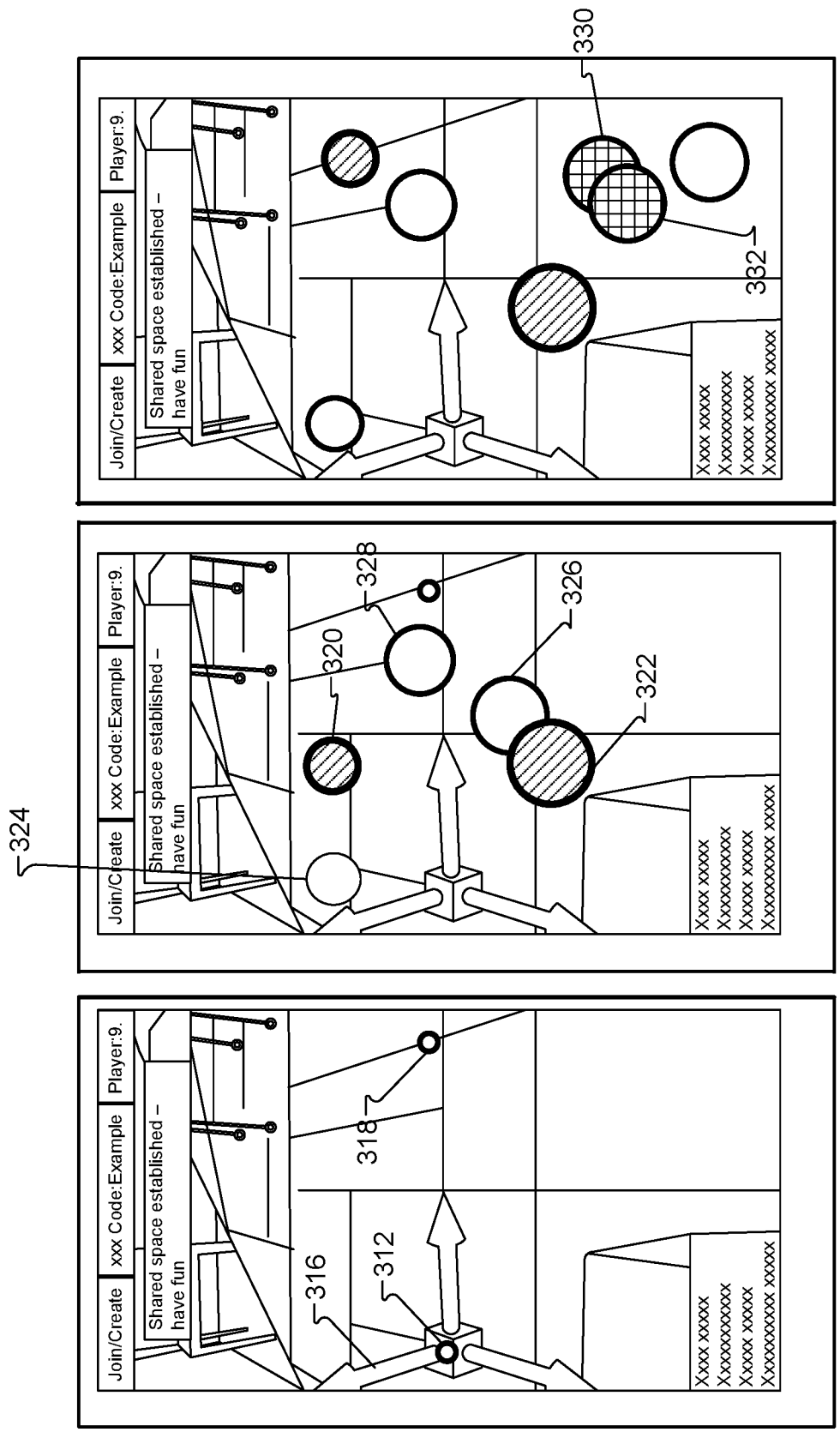

PROVIDING MULTIPLAYER AUGMENTED REALITY EXPERIENCES

TECHNICAL FIELD

This description generally relates to enabling augmented reality experiences between multiple users in a shared space.

BACKGROUND

Content can be displayed to users accessing an immersive virtual reality environment (e.g., VR space) in a number of different ways. In one example, content can be displayed within an application accessed in the VR space. In another example, content can be displayed on or within virtual objects in the VR space. Multiple users may wish to interact with such content at the same time.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method for providing co-presence in an augmented reality environment, the method may include controlling a first computing device and a second computing device to detect at least one plane associated with a scene of the augmented reality environment generated for a physical space. The method may also include receiving, from the first computing device, a first selection of a first location within the scene and a first selection of a second location within the scene, and generating a first reference marker corresponding to the first location and generating a second reference marker corresponding to the second location. The method may further include receiving, from a second computing device, a second selection of the first location within the scene and a second selection of the second location within the scene and generating a reference frame centered at the first reference marker that indicates a direction toward the second reference marker, the reference frame being generated using the at least one plane, the first location, and the second location. The method may also include providing the reference frame to the first computing device and to the second computing device to establish co-presence in the augmented reality environment. Establishing the co-presence may include generating, for the scene, a registration of the first computing device relative to the second computing device. Other embodiments of this aspect include corresponding computer systems, apparatus, and computer programs recorded on one or more computer storage devices, each configured to perform the actions of the methods.

Implementations may include one or more of the following features. The computer-implemented method where the reference frame is generated based on a detected pose associated with the first computing device that selected the first location and the second location and a determined intersection between the second location and the detected plane. The computer-implemented method may also include providing the reference frame to the third computing device to establish co-presence in the augmented reality environment, in response to receiving a third selection of the first location and a third selection of the second location from a third computing device. Establishing the co-presence may include generating, for the scene a registration of the third computing device relative to the first computing device and a registration of the third computing device relative to the second computing device. The method in which receiving, at a second computing device, a selection of the first location within the scene and a selection of the second location within the scene includes automatically detecting, at the second computing device, the first reference marker and the second reference marker.

In some implementations, receiving, from a third computing device, a selection upon the first location and the second location provides access to the application according to the stored application state. The computer-implemented method where the first location represents a first physical feature in the physical environment and the second location represents a second physical feature in the physical environment, the first physical feature and the second physical feature being agreed upon between a user associated with the first computing device and a user associated with the second computing device.

The method may further include displaying in the first computing device the first reference marker corresponding to the first location and displaying in the first computing device, the second reference marker corresponding to the second location. In some implementations, receiving, at the first computing device, a selection of a first location within the scene and a selection of a second location within the scene is triggered by prompts received at a display device associated with the first computing device.

The method may use the established co-presence to access an application in the augmented reality environment and an application state is stored with the reference frame. Re-establishing the reference frame may include having the first computing device, the second computing device, or another computing device selecting upon the first location and the second location to gain access to the application according to the stored application state. In some implementations, the co-presence is established without using position data associated with the first computing device or the second computing device. Implementations of the described techniques may include hardware, a method or process, or computer software on a computer-accessible medium.

In another general aspect, a computer program product tangibly embodied on a non-transitory computer-readable storage medium is described that includes instructions that, when executed by at least one computing device, are configured to cause the at least one computing device to control a first computing device and a second computing device to detect at least one plane associated with a scene of an augmented reality environment generated for a physical space, receive, at the first computing device, a selection of a first location within the scene and a selection of a second location within the scene, and generate a first reference marker corresponding to the first location and generating a second reference marker corresponding to the second location. A reference frame may be generated. The reference frame may be centered at the first reference marker pointed in a direction of the second reference marker. The reference frame may be generated based at least in part on the at least one plane, the first location, and the second location. The reference frame may be provided to the first computing device and to the second computing device to establish co-presence in the augmented reality environment.

Implementations may include one or more of the following features. In some implementations, the computing device is further caused to receive, at a second computing device, a selection of the first location within the scene and a selection of the second location within the scene. In some implementations, the reference frame is used to re-establish the co-presence between the first computing device and the second computing device, in response to losing a connection to augmented reality environment. In some implementations, the reference frame is used to re-establish the co-presence between the first computing device and the second computing device, in response to changing the location of the physical space associated with the augmented reality environment.

In another general aspect, a system is described. The system includes at least one processor and memory storing instructions that, when executed by the at least one processor, cause the system to perform operations including, controlling a first computing device and a second computing device to detect at least one plane associated with a scene of an augmented reality environment generated for a physical space, receiving, at the first computing device, a selection of a first location within the scene and a selection of a second location within the scene, generating a first reference marker corresponding to the first location and generating a second reference marker corresponding to the second location, receiving, at a second computing device, a selection of the first location within the scene and a selection of the second location within the scene, generating a reference frame centered at the first reference marker pointed in a direction of the second reference marker, the reference frame being generated using the at least one plane, the first location, and the second location, and providing the reference frame to the first computing device and to the second computing device to establish co-presence in the augmented reality environment, the co-presence including generating, for the scene, a registration of the first computing device relative to the second computing device.

Implementations may include one or more of the following features. In some implementations, the reference frame is generated based on information associated with the first computing device that selected the first location and the second location and a determined intersection between the second location and the detected plane.

In response to receiving a selection of the first location and a selection of the second location from a third computing device, the system may provide the reference frame to the third computing device to establish co-presence in the augmented reality environment. Establishing the co-presence may include generating, for the scene a registration of the third computing device relative to the first computing device and a registration of the third computing device relative to the second computing device.

In some implementations, the established co-presence is used to access an application in the augmented reality environment and a state is stored with the reference frame. In some implementations, re-establishing the reference frame includes the first computing device, the second computing device, or another computing device selecting upon the first location and the second location to gain access to the application according to the stored state.

In some implementations, the system may receive, at the first computing device, a selection of a first location within the scene and a selection of a second location within the scene is triggered by prompts received at a display device associated with the first computing device. In some implementations, the first location represents a first physical feature in the physical environment and the second location represents a second physical feature in the physical environment, the first physical feature, and the second physical feature being agreed upon between a user associated with the first computing device and a user associated with the second computing device. In some implementations, the co-presence is established without using position data associated with the first computing device or the second computing device.

The details of one or more implementations are set forth in the accompanying drawings and the description below. Other features will be apparent from the description and drawings, and from the claims.

BRIEF DESCRIPTION OF THE DRAWINGS

FIGS. 3A-3F are diagrams depicting example images displayable on a head-mounted display (HMD) device that enable users to configure a multiuser AR environment.

Like reference symbols in the various drawings indicate like elements.

DETAILED DESCRIPTION

Figure 1:
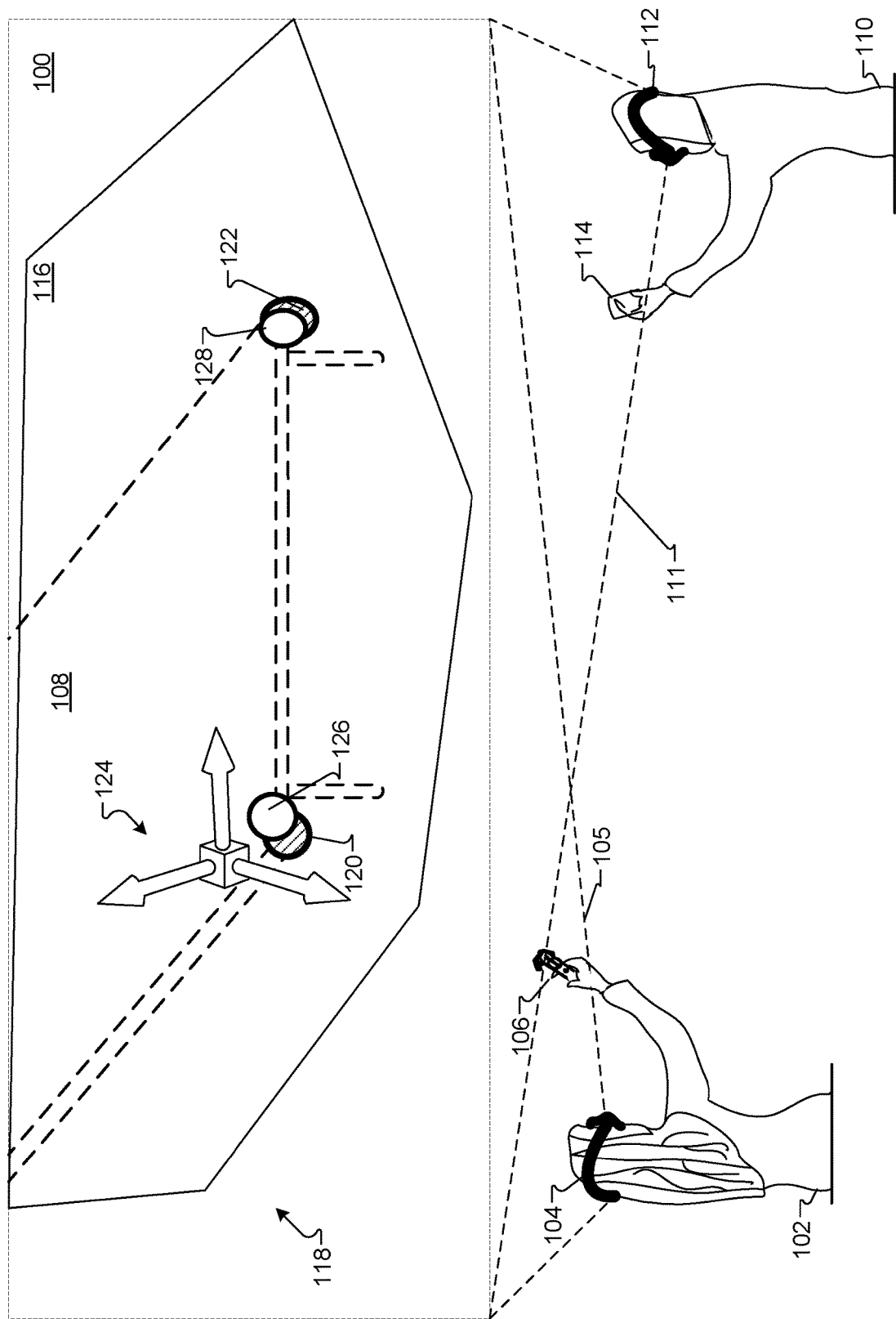
FIG. 1 is a diagram depicting an example of users exploring shared content while in a multiplayer augmented reality (AR) environment.

When two or more users wish to participate in an augmented reality (AR) experience (e.g., game, application, environment, etc.), a physical environment and a virtual environment may be defined to ensure a functional and convenient experience for each user accessing the augmented reality (AR) environment. In addition to the physical environment, a reference frame generated by the systems and methods described herein may be used to allow each computing device (associated with a particular user) to have knowledge about how computing devices (e.g., computing devices) relate to each other while accessing the AR environment in the same physical space. For example, the reference frame can be generated for one computing device and that computing device may share the reference frame with other users accessing the AR environment with a respective computing device. This can provide the other users with a mechanism in which to generate, move, draw, modify, etc. virtual objects in a way for other users to view and interact with such objects in the same scenes in the shared AR environment.

Accordingly, the disclosed embodiments generate a reference frame that is shareable across any number of computing devices. For example, a reference frame may be generated for a first computing device that can be quickly adopted by other computing devices. Using such reference frame, two or more users that wish to access the AR environment can use a computing device to view virtual objects and AR content in the same physical space as the user associated with the reference frame. For example, two users may agree upon two physical points in a scene (e.g., a room, a space, an environment) of an AR environment. The systems and methods described herein can use the two agreed upon locations in the physical environment associated with the AR environment combined with a detectable ground plane (e.g., or other plane) associated with the AR environment to generate a reference frame that can be provided and adopted by any number of users wishing to access the same AR environment and content within the AR environment. In some implementations, the plane described herein may be predefined based on a particular physical or virtual environment. In some implementations, In some implementations, the physical environment used for the AR experience may provide elements that enable all users to interact with content and each other without lengthy configuration settings and tasks. A user can select two locations in a scene using a computing device (e.g., a mobile device, a controller, etc.). The two locations can be selected in various ways described in detail below. For example, the user may select a left corner of a scene and a right corner of the scene. The two selected locations and a predefined (or detected) plane can be used with the systems and methods described herein to generate a reference frame for users to within an AR environment.

In some implementations, a predefined (or detected) plane may represent a plane in a scene on a floor or table surface that is detected by one or more computing devices and/or tracking devices associated with the AR environment. The plane may be detected using sensors, cameras, or a combination thereof. In some implementations, the plane may be selected based on a surface (e.g., a floor, a table, an object, etc.) associated with a particular physical room. In some implementations, the systems and methods described herein may detect the plane. In some implementations, the systems and methods described herein may be provided coordinates for the plane. The plane may be provided for rendering in the AR environment to enable computing devices to select locations for gaining access to reference frames associated with other computing devices.

As used herein, the term co-presence refers to a virtual reality (VR) experience or AR experience in which two or more users operate in the same physical space. As used herein, the term pose refers to a position and an orientation of a computing device camera. As used herein, the term raycast refers to finding a 3D point by intersecting a ray from a computing device with a detected geometry. As used herein, the term shared reference frame refers to a reference frame assumed to be shared by all users in a particular VR or AR environment.

FIG. 1 is a diagram depicting an example of users exploring shared content while in a multiplayer augmented reality (AR) environment 100. A first user 102 is wearing a head-mounted display (HMD) device 104 and holding a computing device 106. The user 102 is viewing environment 100, as indicated by lines 105.

The computing device 106 may be, for example, a computing device such as a controller, or a mobile device (e.g., a smartphone, a tablet, a joystick, or other portable controller(s)) that may be paired with, or communicate with, the HMD device 104 for interaction in the AR environment 100. The AR environment 100 is a representation of an environment that may be generated by the HMD device 104 (and/or other virtual and/or augmented reality hardware and software). In this example, the user 102 is viewing AR environment 100 in HMD device 104.

The computing device 106 may be operably (e.g., communicably) coupled with, or paired with the HMD device 104 via, for example, a wired connection, or a wireless connection such as, for example, a Wi-Fi or Bluetooth connection. This pairing, or operable coupling, of the computing device 106 and the HMD device 104 may provide for communication and the exchange of data between the computing device 106 and the HMD device 104 as well as communications with other devices associated with users accessing AR environment 100.

The computing device 106 may be manipulated by a user to capture content via a camera, to select, move, manipulate, or otherwise modify objects in the AR environment 100. Computing device 106 and the manipulations executed by the user can be analyzed to determine whether the manipulations are configured to generate a shareable reference frame to be used in AR environment 100. Such manipulations may be translated into a corresponding selection, or movement, or other type of interaction, in an immersive VR or AR environment generated by the HMD device 104. This may include, for example, an interaction with, manipulation of, or adjustment of a virtual object, a change in scale or perspective with respect to the VR or AR environment, and other such interactions.

In some implementations, the environment 100 may include tracking systems that can use location data associated with computing devices (e.g., controllers, HMD devices, mobile devices, etc.) as a basis to correlate data such as display information, safety information, user data, or other obtainable data. This data can be shared amongst users accessing the same environment 100.

As shown in FIG. 1, a second user 110 is wearing a head-mounted display (HMD) device 112 and holding a computing device 114. Because the HMD device 112 and computing device 114 may be utilized as described above with respect to user 102, HMD 104, and computing device 106. Accordingly, the above details will not be repeated herein. The user 110 is viewing environment 100, as indicated by lines 111.

The user 102 and user 110 are both accessing AR environment 100. The users may wish to collectively engage with multiple objects or content in the environment 100. For example, a table 108 is depicted. The users may wish to utilize table 100 together in the AR environment 100. To do so, the systems and methods described herein can enable multiple users to experience co-presence in augmented environment 100 using a computing device associated with each user and two or more user interface selections performed by each user.

For example, the systems described herein can control a first computing device 104 and a second computing device 114 to display a plane 116 associated with a scene 118 of the augmented reality environment 100 generated for a physical space shared by two or more users (e.g., users 102 and 110).

The user 102 may use computing device 106 to select a first location in the scene 118. The selected first location may be represented at location 120 by a shaded reference marker. The device 106 may receive the selection of the first location 120 and generate the shaded reference marker to be placed at the first location 120. Similarly, the user 102 may use computing device 106 to select a second location 122 in the scene 118. The selected second location may be represented at location 122 by another reference marker. The device 106 may receive the selection of the second location 122 and generate the reference marker to be placed at the second location 122.

In response to receiving both the first location 120 and the second location 122, the systems described herein can generate a reference frame 124 centered at the first reference marker location 120 pointed in a direction of the second reference marker location 122. The reference frame 124 may be generated based at least in part on the plane 116, the first location 120, and the second location 122. In some implementations, the systems described herein can generate the reference frame 124 based on a defined direction indicating a plane, gravity, and/or other directional indicator. Any number of algorithms may be utilized to generate the reference frame 124. Such algorithms are described in detail with reference to FIG. 5A to FIG. 7.

In some implementations, a second computing device (e.g., associated with a second user) may wish to join the AR environment 100 and have access to content within the environment 100. Accordingly, the second user 110 may utilize the second computing device 114 to select locations in the scene 118 similar to the first location 120 and the second location 122. The locations may be similar because the second computing device may be in the same physical space as computing device 106, but may be at a different angle. In other implementations, the locations may be similar, but not identical because the first user 102 and the second user 110 agreed upon two general locations within a physical environment associated with the AR environment 100. The general locations may, for example have included a left and a right corner of the table 108 in the physical space. The first user 102 may select the first location 120 at the corner of the table 108 and the second location 122 at the right corner of the table. The second user 110 may select near the left corner at a first location 126 and near a right corner at location 128. While the locations 120 and 122 may not correspond exactly to locations 126 and 128, the locations are close enough to provide the same reference frame 124 used by the first user 102 with the second user 110.

The reference frame 124 may be provided to the first computing device 106 and to the second computing device 114 to establish co-presence (e.g., or a multiplayer application/game) in the augmented reality environment 100 based on the synchronize-able locations 120 and 126 and 122 and 128, respectively. Although reference point 120 is shown at a slightly different location 126 (for clarity), both reference points 120 and 126 may indicate an exact same location in the AR environment 100. To generate the reference frame 124, both reference points 120 and 126 may be the same locations. Thus, location 120 represents a first user selecting a point in space in environment 100 while location 126 represents a second user selecting the same point in space in the environment 100. Similarly, both reference points 122 and 128 may indicate an exact same location in the AR environment 100. To generate (or share) reference frame 124, both reference points 122 and 128 may be the same locations. That is, the location 122 represents a first user selecting a point in space in environment 100 while location 128 represents a second user selecting the same point in space in the environment 100.

The users 102 and 110 can access applications, content, virtual and/or augmented objects, game content, etc. using the reference frame 124 to correlate movements and input provided in environment 100. Such a correlation is performed without receiving initial tracking data and without mapping data for the AR environment 100. In effect, computing device 102 need not provide perceived environment data (e.g., area description files (ADF), physical environment measurements, etc.) to computing device 114 to ascertain positional information and reference information for other devices that select the two location points (e.g., 120/122).

In some implementations, a user may lose a connection to AR environment 100. For example, users may drop a computing device that is tracking (or being tracked), stop accessing AR environment 100 or elements within AR environment 100, or otherwise become disconnected from AR environment 100, etc. The reference frame 124 may be used by a computing device to re-establish the co-presence (e.g., multiplayer interaction in the AR environment 100) between computing devices accessing the AR environment 100. The re-establishment may be provided if a computing device again selects the two locations 120 and 122, for example. Selection of such locations 120 and 122 may trigger re-sharing of the reference frame 124, for example.

In some implementations, the reference frame 124 may be used to re-establish the co-presence between the first computing device 106 and the second computing device 114, in response to changing the location of the physical space associated with the AR environment 100. For example, if users 104 and 110 decide to take a game that is being accessed in AR environment 100 to a different location at a later time, the users 102 and 110 can re-establish the same game content, game access, reference frame 124, and/or other details associated with a prior session accessing AR environment 100. The re-establishment can be performed by selecting the locations 120 and 122 in a new physical environment. The locations 120 and 122 may pertain to a different table in a different physical space. Similarly, if the locations pertained to a floor space, a different physical floor space may be utilized to continue the AR environment session at the new physical space without losing information associated with prior session(s) and without reconfiguring location data associated with both users. To re-establish the session in the AR environment 100, the users may verbally agree upon two locations in the new physical environment. Each user can select upon the verbally agreed to locations in the new environment. Once the users complete the selections, a reference frame may be established to enable harmonious sharing of the physical space and content in the environment 100.

In another example of providing a multiplayer (e.g., co-presence) AR environment 100, the first user 102 may wish to decorate a room with the second user 110. Both users 102 and 110 may open an application on respective computing devices 106 and 114 to launch the application. Both users may be prompted by the application to initialize a shared space. In some implementations, both users are co-present in the same physical space. In some implementations, both users access the application from separate physical spaces. For example, both users may wish to collaborate in decorating a living room space. The first user 102 need not be present in the living room of the second user in order to do so. In general, both users may establish a shared reference frame. For example, both users 102 and 110 (or any number of other users) may agree upon using a first and second corner of a room as locations in which to synchronize how each user views the space in the AR environment on respective computing devices 106 and 114.

To establish the shared reference frame, the first user 102 may be provided a plane in the screen of computing device 106 and may move computing device 106 to point an on-screen cross-hair, for example, at the first corner of the room to view (e.g., capture) the room with the on-board camera device. The user may tap (e.g., select) a button (e.g., control) to confirm the first corner as a first location (e.g., location 120). The first user 102 may repeat the movement to select a second location (e.g., location 122) at the second corner.

Similarly, the second user 110 can be provided a plane in the screen of computing device 114 and may move computing device 114 to point an on-screen cross-hair, for example, at the first corner of the room to view (e.g., capture) the room with the on-board camera device. The user 110 may tap (e.g., select) a button (e.g., control) to confirm the first corner as a first location (e.g., location 126—which may correspond to the same location 120). The user 110 may repeat the movement to select a second location (e.g., location 128—which may correspond to the same location 128) at the second corner.

Upon both users selecting particular agreed upon locations, the shared frame 124 is now established. Both users 102 and 110 may begin decorating the room and collaboratively placing content that both players can view. The shared reference frame 124 may provide an advantage of configuring a room layout using reference frame 124 as a local frame of reference that each device 106 and 114 can share in order to coexist and interact in the environment 100 without overstepping another user or object placed in the environment 100.

In some implementations, if the user 102 accidentally drops device 106, device tracking may be temporarily lost and as such, the frame of reference may not be accurate. Because the reference frame is saved during sessions, the user 102 may retrieve the device 106 and the reference frame may re-configure according to the previously configured reference frame. If the application had closed or the device 106 had been rebooted, the user can again join the same session by repeating the two location selections to re-establish the same reference frame with user 114, for example.

At any point after the shared reference frame is configured, additional users may join the session. For example, if a third user wishes to join the session in the AR environment 100, the third user may use a third computing device to select the first location 120 and the second location 122, for example to be provided the shared reference frame. Once the reference frame 124 is shared with the third user, the third user may instantly view content that the first user 102 and the second user 110 placed in environment 100. The third user may begin to add content as well. In general, content added by each user may be color coded, labeled, or otherwise indicated as belonging to a user that placed the content.

Because the reference frame is stored with the device, any user that has been previously provided to the reference frame can open the application, initialize the shared reference frame by selecting the same two locations (e.g., location 120 and location 122) to begin viewing the content from the last session.

Provision of the shared reference frame may establish co-presence in the AR environment 100 for the third user. In some implementations, provision of the co-presence may include generating, for the scene a registration of the third computing device relative to the first computing device and a registration of the third computing device relative to the second computing device. In some implementations, a co-presence may be established without using position data associated with the first computing device 106 or the second computing device 114. That is, transferring of tracking location between device 106 and device 114 may not occur before the reference frame is configured because sharing such data is unnecessary with the techniques described herein. Instead, the reference frame can be generated and shared using the plane and each user selection of two locations within the plane (and within the AR environment).

In some implementations, the established co-presence is used to access an application in the AR environment 100 and an application state may be stored with the reference frame. Re-establishing the reference frame may include the first computing device 106, the second computing device 114, or another computing device selecting upon the first location 120 and the second location 122 to gain access to the application according to the stored application state. In some implementations, the first location 120 represents a first physical feature (e.g., an edge of a physical object) in the physical environment and the second location 122 represents a second physical feature in the physical environment.

In some implementations, the established co-presence is used to access a game in the AR environment 100 (e.g., the decorating application) and a game state is stored with the reference frame. Re-establishing the reference frame may include the first computing device 106, the second computing device 114, or another computing device selecting upon the first location 120 and the second location 122 to gain access to the game according to the stored game state. In some implementations, the first location 120 represents a first physical feature (e.g., an edge of a physical object) in the physical environment and the second location 122 represents a second physical feature in the physical environment. The second physical feature may be another portion of the same object. In some implementations, the first physical feature and the second physical feature may include any combination of wall locations, floor locations, object locations, device locations, etc. In general, the first physical feature and the second physical feature may be agreed upon between a user associated with the first computing device and a user associated with the second computing device. For example, if the table 108 is agreed upon as the physical feature in which to base the reference frame, the first physical feature may pertain to a first location on the table 108 while the second physical feature may pertain to a second location on the table.

Figure 2:
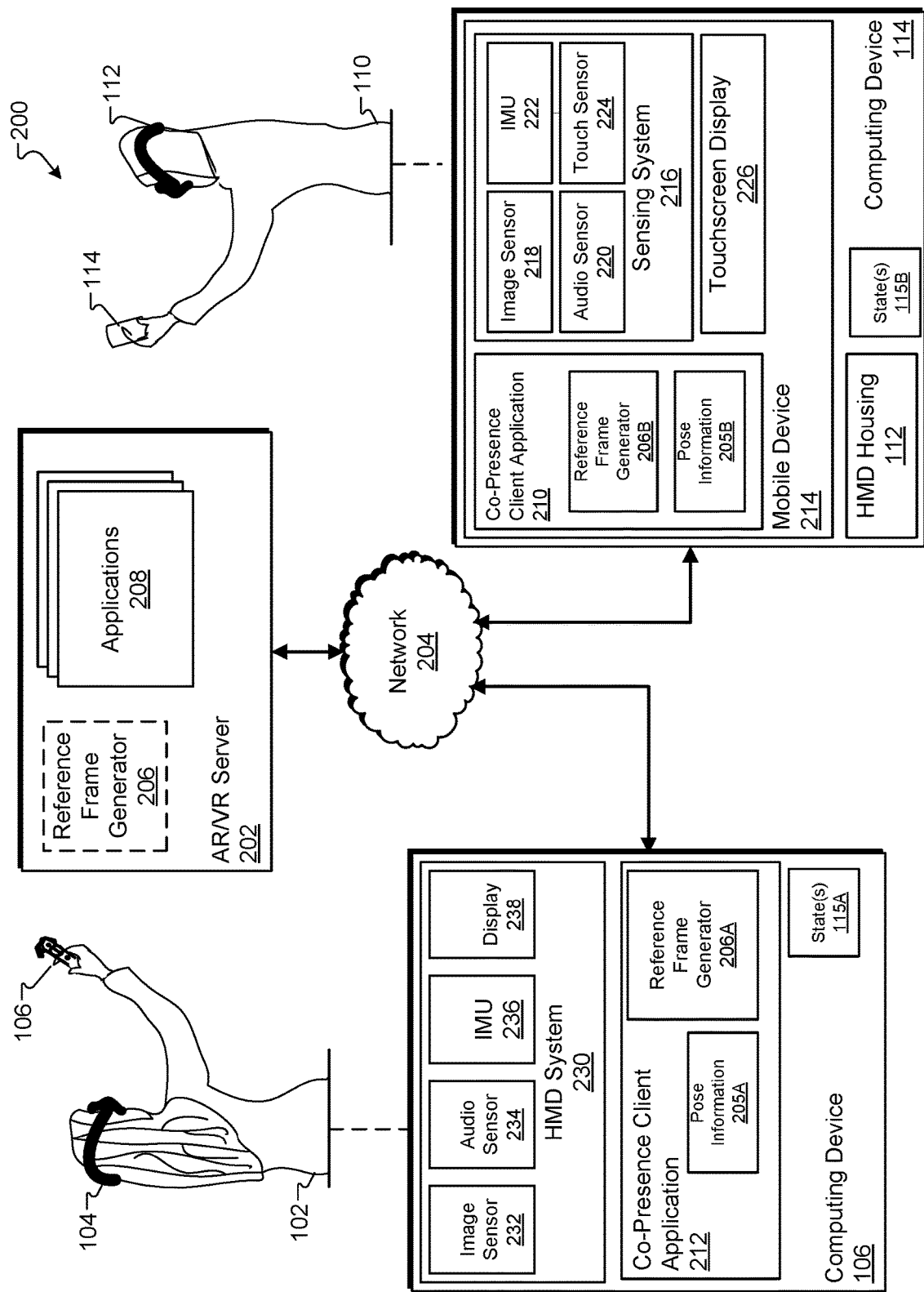
FIG. 2 is a block diagram of an example system for generating and maintaining co-presence for multiple users accessing an AR environment.

FIG. 2 is a block diagram of an example system 200 for generating and maintaining co-presence for multiple users (e.g., users 102 and 110 and/or additional users) accessing a VR environment or AR environment. In general, the system 200 can provide a shared reference frame amongst computing devices accessing the same AR environment. As shown a networking computing system 200 can include a virtual reality/augmented reality (VR/AR) server 202, computing device 106 and computing device 114.

In operation of system 200, the user 102 operates computing device 106 and user 110 operates computing device 114 to participate in a multiuser (e.g., co-presence) AR environment (or VR environment) 100, for example. In some implementations, computing device 106 and computing device 114 can communicate with AR/VR server 202 over network 204. Although the implementation depicted in FIG. 2 shows two users operating computing devices to communicate with AR/VR server 202, in other implementations, more than two computing devices can communicate with server 202 allowing more than two users to participate in the multiuser AR environment.

In some implementations, server 202 is a computing device such as, for example, computer device 800 shown in FIG. 8 described below. Server 202 can include software and/or firmware providing the operations and functionality for tracking devices (not shown) and one or more applications 208.

In some implementations, applications 208 can include server-side logic and processing for providing a game, a service, or utility in an AR environment. For example, applications 208 can include server-side logic and processing for a card game, a dancing game, a virtual-reality business meeting application, a shopping application, a virtual sporting application, or any other application that may be provided in an AR environment. Applications 208 can include functions and operations that communicate with client-side applications executing on computing device 106, computing device 114, or other computing devices accessing AR environment 100. For example, applications 208 can include functions and operations that communicate with co-presence client application 210 executing on computing device 114, and/or co-presence client application 212 executing on computing device 106. In some implementations, applications 208 are instead provided from other non-server devices (e.g., a local computing device).

According to some implementations, applications 208 executing on AR/VR server 202 can interface with one or more reference frame generator 206. The reference frame generator 206 may be optionally located at the AR/VR server 202 to generate and provide shareable reference frames based on input received from one or more computing device. Alternatively, each device may include a reference frame generator (e.g., reference generator 206A in device 106 or 206B in device 114 to manage co-presence virtual environments by aligning reference frames amongst users in the AR environment 100, for example. In some implementations, such interfacing can occur via an API exposed by individual applications executing on computing device 106 or computing device 114, for example.

In some implementations, the computing device 106 may store one or more game/application states 115A associated with any number of accessed applications 208. Similarly, the computing device 114 may store one or more game/application states 115B associated with any number of accessed applications 208.

Referring again to FIG. 2, user 110 operates computing device 114 and HMD device 112. In some implementations, a mobile device 214 can be placed into HMD housing 112 to create a VR/AR computing device 114. In such implementations, mobile device 214 may provide the processing power for executing co-presence client application 210 and render the environment 100 for device 114 for use by user 110.

According to some implementations, mobile device 214 can include sensing system 216 which can including image sensor 218, audio sensor 220, such as is included in, for example, a camera and microphone, inertial measurement unit 222, touch sensor 224 such as is included in a touch sensitive surface/display 226 of a handheld electronic device, or smartphone, and other such sensors and/or different combination(s) of sensors. In some implementations, the application 210 may communicate with sensing system 216 to determine the location and orientation of device 114.

In some implementations, mobile device 214 can include co-presence client application 210. Co-presence client application 210 can include client logic and processing for providing a game, service, or utility in the co-presence virtual or augmented reality environment. In some implementations, co-presence client application 210 can include logic and processing for instructing device 114 to render a VR or AR environment. For example, co-presence client application 210 may provide instructions to a graphics processor (not shown) of mobile device 214 for rendering the environment 100.

In some implementations, co-presence client application 210 can communicate with one or more applications 208 executing on server 202 to obtain information about the environment 100. For example, co-presence client application 210 may receive data that can be used by mobile device 214 to render environment 100. In some implementations, co-presence client application 210 can communicate with applications 208 to receive reference frame data which co-presence client application 210 can use to change how device 114 displays co-presence virtual environment or AR content in such an environment.

According to some implementations, the co-presence client application 210 can provide pose information to applications 208 and application 210 may then communicate that position and orientation information to applications 208. In some implementations, co-presence client application 210 may communicate input data received by mobile device 214, including image data captured by image sensor 218, audio data captured by audio sensor 220, and/or touchscreen events captured by touch sensor 224. For example, HMD housing 112 can include a capacitive user input button that when pressed registers a touch event on touchscreen display 226 of mobile device 214 as if user 110 touched touchscreen display 226 with a finger. In such an example, co-presence client application 210 may communicate the touch events to applications 208.

Reference frame generator 206A (in computing device 106) and reference frame generator 206B (in computing device 114) may be configured to perform functions and operations that manage information including, but not limited to, physical spaces, virtual objects, augmented virtual objects, and reference frames for users accessing environment 100. According to some implementations, reference frame generator 206, 206A, and 206B manages such information by maintaining data concerning a size and shape of the environment 100, the objects within the environment 100, and the computing devices accessing the environment 100. Although reference frame generators 206A, and 206B is depicted in FIG. 2 as a separate functional component from server 202, in some implementations, one or more of applications 208 can perform the functions and operations of reference frame generator 206, 206A, and 206B.

For example, reference frame generator 206, 206A, and 206B can include a data structure storing points (e.g., locations) representing the space of the environment 100. The locations stored in the data structure can include x, y, z, coordinates, for example. In some implementations, reference frame generator 206, 206A, and 206B can also include a data structure storing information about the objects in the environment 100.

In some implementations, reference frame generator 206, 206A, and 206B can provide a location of a computing device accessing the AR environment 100. Such a location can be shared in the form of a reference frame with other users accessing the AR environment 100. The reference frame can be used as a basis for the other users to align content and location information with another user in the AR environment 100.

In another example, image sensor 218 of mobile device 214 may capture body part motion of user 110, such as motion coming from the hands, arms, legs or other body parts of user 110. Co-presence client application 210 may render a representation of those body parts on touchscreen display 226 of mobile device 214, and communicate data regarding those images to applications 208. Applications 208 can then provide environment modification data to co-presence client application 210 so that co-presence client application 210 can render an avatar corresponding to user 110 using the captured body movements.

A user 102 is shown in FIG. 2 operating computing device 106. Computing device 106 can include HMD system 230 and user computer system 228. In some implementations, device 106 may differ from device 114 in that HMD system 230 includes a dedicated image sensor 232, audio sensor 234, IMU 236, and display 238, while device 114 incorporates a general-purpose mobile device 214 (such as mobile device 882 shown in FIG. 8, for example) for its image sensor 218, audio sensor 220, IMU 222, and display 226. Device 106 may also differ from device 114 in that HMD system 230 can be connected as a peripheral device in communication with user computer system 228, which can be a general purpose personal computing system (such as laptop computer 822).

While FIG. 2 shows computing devices of different hardware configurations, in other implementations, the devices communicating with AR/VR server 202 can have the same or similar hardware configurations.

In some implementations, the system 200 may provide a three-dimensional AR environment or VR environment, three-dimensional (volumetric) objects, and VR content using the methods, components, and techniques described herein. In particular, system 200 can provide a user with a number of options in which to enabling co-presence for a multiplayer experience in a VR environment.

The example system 200 includes a number of computing devices that can exchange data over a network 204. The devices may represent clients or servers and can communicate via network 204, or another network. In some implementations, the client devices may include one or more gaming devices or controllers, a mobile device, an electronic tablet, a laptop, a camera, VR glasses, or other such electronic device that may be used to access VR and AR content.

FIGS. 3A-3F are diagrams depicting example images displayable on a head-mounted display (HMD) device that enable users to configure a multiuser AR environment. In general, the diagrams shown in FIGS. 3A-3F may be provided using device 106 or 114 as described throughout this disclosure. In general, a user may wish to configure a multiuser AR environment for any number of users. To do so, at least two users may agree to use particular locations in the physical space and may place content within the space. In addition, the at least two users may select a color to represent objects generated and/or modified by the user while in the AR environment.

As shown in FIG. 3A, a user may be prompted to join or begin a game in AR environment 100, for example. The prompt may include a user interface, such as example interface 302 requesting a room code 304 and offering a chance to select a color 306 to be associated with the user. The user may then select join to be provided the user interface shown in FIG. 3B.

As shown in FIG. 3B, the prompt may include an indication 308 to define a shared space by tapping a point on the plane 310. The plane 310 is provided as an overlay over at least a portion of the scene depicted in AR environment 100, for example. In some implementations, the scene may represent a portion of the physical space being utilized for the AR environment 100. The plane 310 may be a plane defining a floor in the scene. The plane may be detected, determined, or otherwise provided to a computing device (e.g., computing device 106) prior to the user requesting access to the AR environment 100, for example. The user may select a location in the user interface shown in FIG. 3B, which may trigger display of user interface shown in FIG. 3C in device 106, for example. In this example, the user selected location 312. In response, the system 200 generated a reference marker for placement at location 312. Upon selecting the location 312, the user may be prompted 314 to select a second point at least a meter away from the first location 312. In some implementations, the user may be prompted 314 to select a point any distance from the first location 312. Upon selecting the second location, the user interface shown in FIG. 3D is provided in device 106, for example.

FIG. 3D depicts the first selected location 312 and populated a reference frame 316. The reference frame 316 is generated as a coordinate frame centered at the first location 312 and pointing to the second location, now shown by an indicator at location 318. In particular, the reference frame may be centered at the first reference marker and the first reference marker may indicate a direction toward the second reference marker. In some implementations, the reference frame 316 may be generated using a single location 312 and the plane 310. For example, the reference frame 316 may utilize pose (e.g., position and orientation information 205A or 205B) captured by a camera associated with either device 106 or device 114 to generate the frame 316.

The above process described in FIGS. 3A-3D may be performed by each additional user wishing to join the multi-user (e.g., co-presence) AR environment. It is noted that the users may carry out the same steps and details will not be repeated herein.

FIG. 3E depicts a user interface depicting a shared reference frame in which at least two users are accessing an AR environment. The first user has placed objects 320 and 322, as shown by the shading in the indicators. A second user has carried out the selection of locations 312 and 318 to begin sharing the same reference frame as the first user. The second user has placed objects 324, 326, and 328. FIG. 3F depicts a third user having carried out the selection of locations 312 and 318 to begin sharing the same reference frame as the first user and the second user. The third user has begun interacting with content and placing objects in the AR environment, as shown by object 330 and 332.

In some implementations, an application utilized by one or more users may assume the shared reference frame is aligned for all users based on the users selecting the two location points, as described throughout this disclosure. In some implementations, users may join or resume access to the AR environment at a later by designating the same physical features. With each device running local mapping in the background, a device can recover if it loses tracking temporarily.

In general, the systems and methods described herein may not be limited to a co-presence environment. For example, a shared experience may be obtained using the systems and methods described herein in which a plurality of users in several distinct physical locations (e.g., environments, rooms, cities, etc.) each designate their own area (e.g., table, floor space, court, room, etc.) as a play space, and the application 208 may present the game to all players on each user's local area representing a play space.

In some implementations, the first location represents 120 a first physical feature (e.g., a first table corner) in the physical environment and the second location 122 represents a second physical feature (e.g., a second table corner) in the physical environment. The first physical feature and the second physical feature may be agreed upon between a user associated with the first computing device and a user associated with the second computing device.

Figure 4:
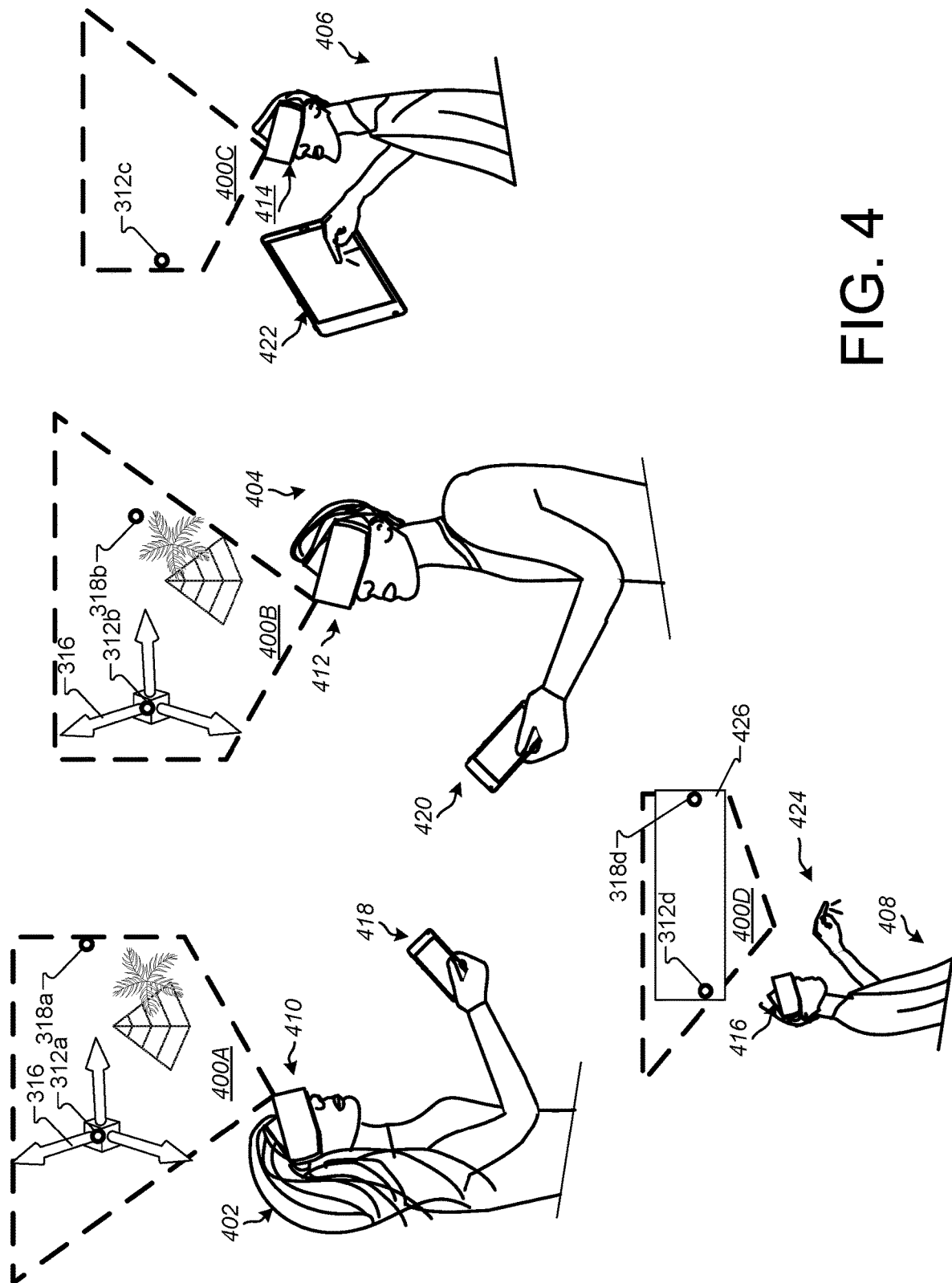
FIG. 4 is a diagram depicting an example of users exploring shared content while in a multiplayer AR environment.

FIG. 4 is a diagram depicting an example of users exploring shared content while in a multiplayer AR environment. As shown in FIG. 4, a number of users 402, 404, 406, and 408 may wish to access AR environment 100. Each user can understand that a game that takes place on a game court is to be played in the AR environment 100. Each user may agree to rectangular rooms in which the reference points (e.g., locations) belong on one of the walls in the rectangular room that represents a short side of the rectangle. The users can also agree that the at least two locations should be centered between the ceiling and the floor and be two meters apart.

The example implementation shown in FIG. 4 will be described with respect to one or more users wearing an HMD device that substantially blocks out the ambient environment, so that the HMD device generates a VR or AR environment, with the user's field of view confined to the environment generated by the HMD device. However, the concepts and features described herein may also be applied to other types of HMD devices, and other types of virtual reality environments and augmented reality environments. In addition, the examples shown in FIG. 4 include a user illustrated as a third-person view of the user wearing an HMD device and holding controllers, computing devices, etc. The views in areas 400A, 400B, 400C, and 400D represent a first person view of what may be viewed by each respective user in the environment generated by each user's respective HMD device and the systems described herein. The AR/VR server 202 may provide application data, reference frame data, game data, etc.

As shown in FIG. 4, each user 402, 404, 406, and 408 is accessing or associated with an HMD device (e.g., respective devices 410 for user 402, device 412 for user 404, device 414 for user 406, and device 416 for user 408. In addition, each user may be associated with one or more controllers and/or computing devices. As shown in this example, user 402 is associated with computing device 418, user 404 is associated with computing device 420, and user 406 is associated with tablet computing device 422. User 408 is shown generating input using gestures 424 rather than inputting content on a computing device. Such gestures 424 may be detected and tracked via tracking devices within the VR space and/or tracking devices associated with a user (e.g., mobile device in the user's pocket, or near the user, etc.).

User 402 and user 404 are sharing a reference frame 316 and each device associated with users 402 and 404 may be sharing information and objects in the AR environment 100. For example, users 402 and 404 may wish to play a table-top augmented reality game. Users 402 and 404 may mutually agree to using two corners of a kitchen table in both of the users' respective homes.

The game (e.g., application 208) may prompt both users to initialize a shared space. A plane may be detected and displayed in the room (e.g., scene) for each user. The first user 402 selects a first corner at location 312a of a first table and a second corner at location 318a of the first table. The second user 402 selects a first location 312b of the second table and a second location 318b of the second table. To do so, each player may move a respective computing device to point at an on-screen cursor, for example, at the first location and the second location to the respective tables. Upon completion of the selections, the system 200, for example, can use the pointing to the location to generate a three dimensional point in space. The system 200 may then intersect with the detected plane for example, to establish a shared reference frame for the users. The users may then begin to interact with one another using the shared reference frame.

At some point, the third user 406 may wish to play and can begin the process of selecting locations on a local table associated with a physical space in use by user 406, as shown by an indicator at location 312c. User 408 is being shown a plane 426 and has selected a first location 312d and a second location 318d. User 408 may soon join the AR environment session because both locations have been selected. The system 200 may shortly share the reference frame associated with users 402 and 404, each of which are actively using AR environment 100, for example.

At some point in time, any of the players 402-408 may wish to save the game and finish the game at a later time. For example, players 402 and 404 may wish to meet later at a coffee shop to complete the game in a co-present location. Both users can select respective locations (312a and 318a for user 402 and 312b and 318b for user 404). The game may resume upon receiving the input and providing the shared reference space amongst computing devices 418 and 420.

There may be numerous ways to define a reference frame. In some implementations, a combination of geometric primitives (e.g., location points, six degrees of freedom poses, etc.). In general, an accuracy with which a geometric feature can be detected or specified through a user interface by each device may be considered. The ability to provide accurate feature recognition, detection, and/or capture may impact the relative alignment of a shared reference frame across devices. For example, accuracy can be considered in terms of pose (i.e., both position and orientation). If the pose can be captured accurately by the computing devices described herein, accurate features can be determined.

The systems described herein can provide a level of automation for assisting the user to specify a geometric feature using a computing device. For example, a medium amount of automation may include a user interface that snaps a cursor to the nearest edge (e.g., or corner) in two dimensional image space. The computing device can provide the snap to location and the user may confirm the location. This can remove inaccuracies caused by users capturing content in an unsteady manner with a mobile device, for example. High automation may include detection of an object or AR marker without input from the user.

A degree to which multiple players can specify the geometric features at the same time may be considered when analyzing shared reference frames. A method that includes having each device to go to a specific physical location (e.g., hold the computing device above each corner of a table) implies that multiple players may carry out such a capture of the corner in a serial fashion. A method that allows each device to specify a physical point at a distance (e.g., select upon a computing device screen to raycast a point on the ground) may indicate that multiple players can do such selections at the same time without occupying the target physical space.

In general, a reference frame may have 6 degrees of freedom. The reference frame can be defined by a set of geometric primitives that constrain these 6 degrees of freedom in a unique way. For example, this can take several forms including, but not limited to a single rigid body, two 3D points and an up vector, three 3D points that are not collinear, and one 3D point and two directions.

Figure 5A:
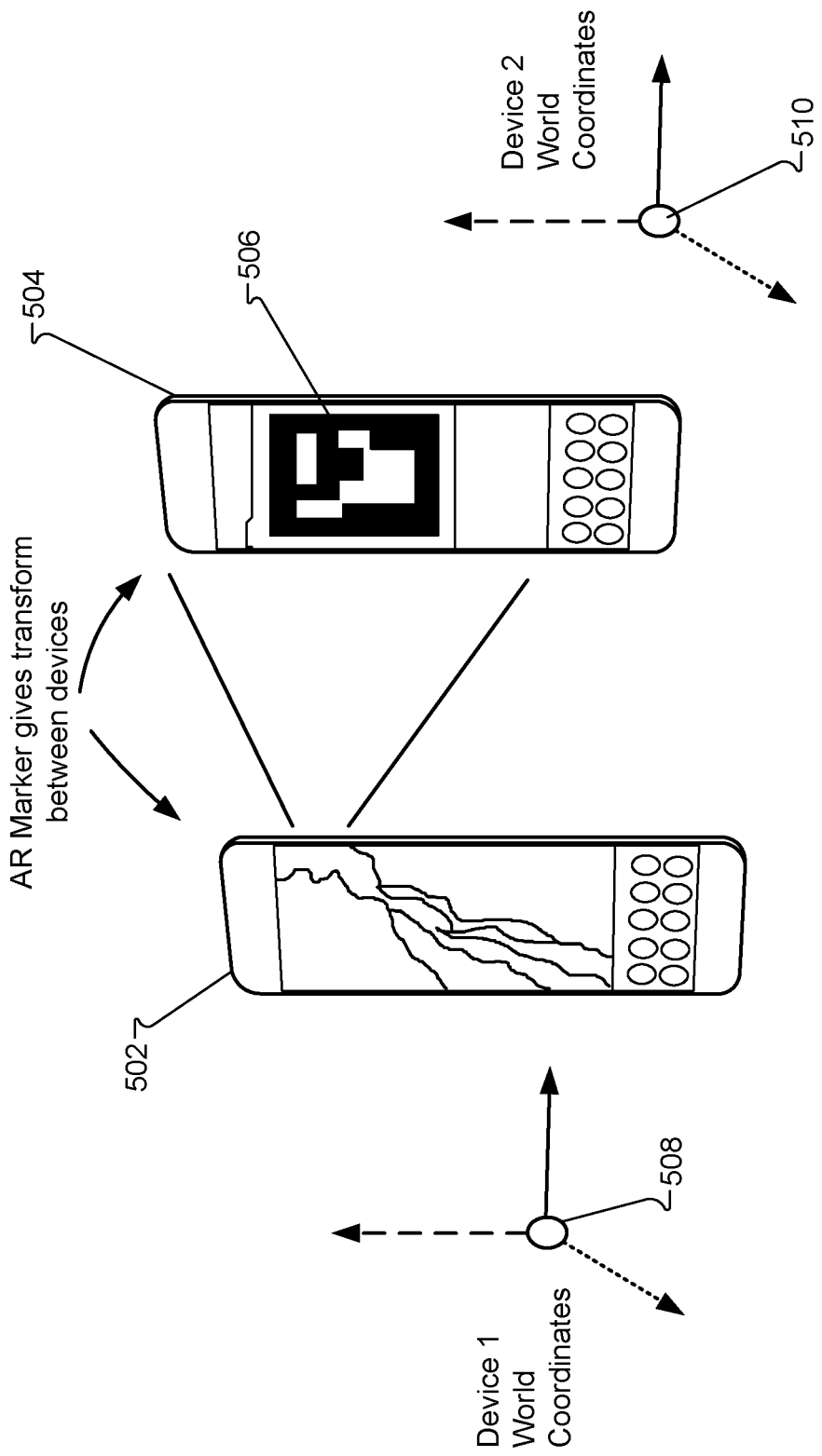
FIGS. 5A-5B are diagrams depicting an example of determining a shared reference frame based on a single rigid body.
Figure 5B:
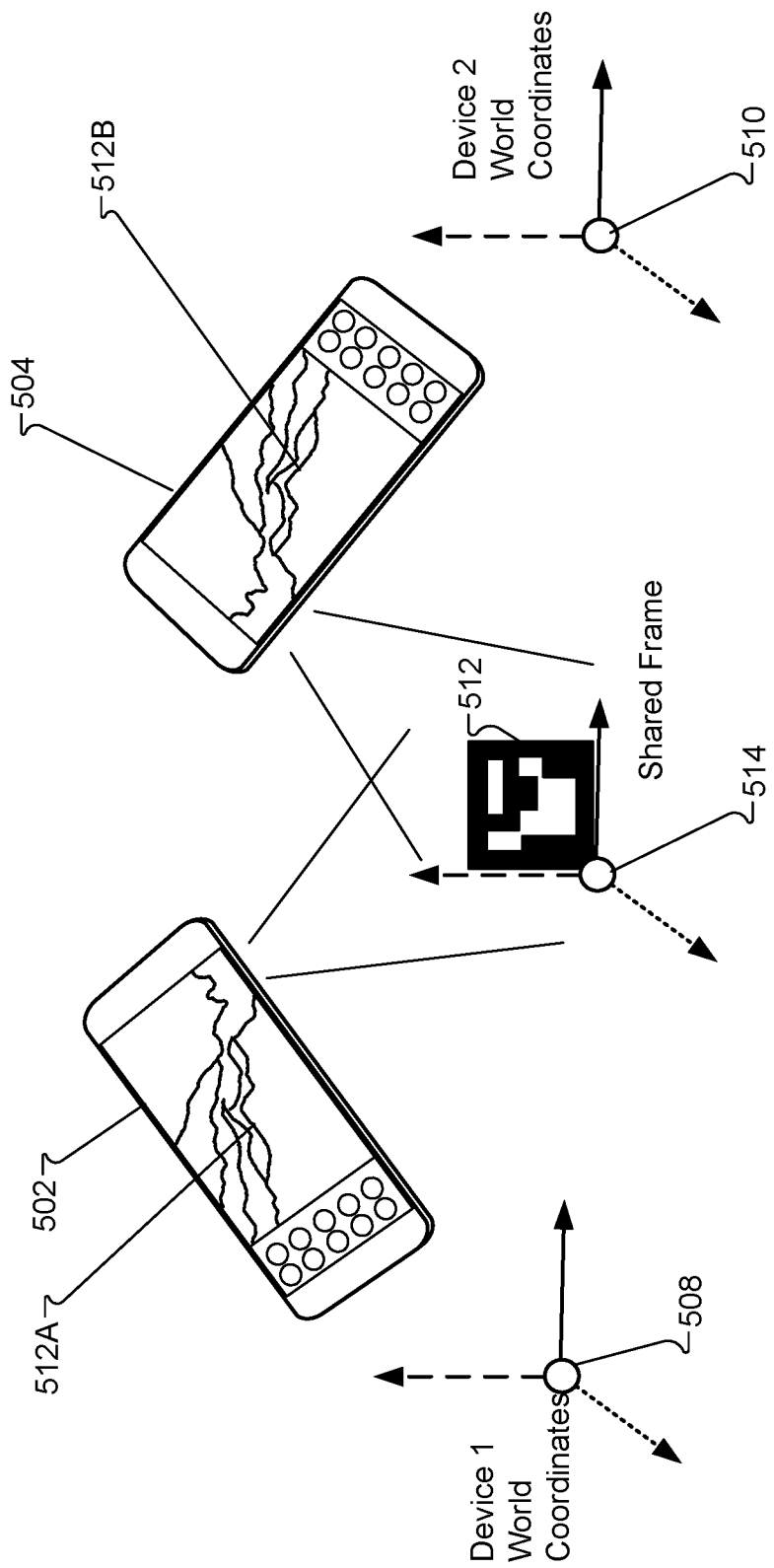

If two or more devices use one of the above constraint methods to specify the same geometric feature (e.g., a physical location) in space, then the defined reference frame may be considered consistent across all devices. FIGS. 5A-5B are diagrams depicting an example of determining a shared reference frame based on a single rigid body.

An example constraint method of using a single rigid body may rely on all devices wishing to share a reference frame being able to determine a pose (e.g., position and orientation) of a single rigid body at a known time. This allows all devices to calculate a transformation between the world tracking frame of the computing device and the pose of the shared reference frame. In such an example, each device 502 and 504 may begin using an identical starting pose. At least one device (e.g., device 504) may display an AR tag 506 on device 504, while prompting other devices (e.g., device 502) to scan the first device. Such a method may assume knowledge of the screen-to-camera extrinsic. This may generate a shared reference frame for device 502 and device 504 to correlate device world coordinates 508 from device 502 with device world coordinates 510 from device 504.

FIG. 5B depicts an example in which all devices (e.g., device 502 and device 504) prompt users associated with such devices to point at a physical object in a scene (e.g., room) using an onboard camera. The physical object may be detected and pose can be determined. For example, device 502 may point at physical object, represented in the screen as object 512A in a scene. Device 504 may point at the same physical object, represented in the screen as object 512B. A shared frame 514 can be established based on the selection of the same physical object 512. Thus, world coordinates 508 from device 502 may be correlated with device world coordinates 510 from device 504.

Figure 6A:
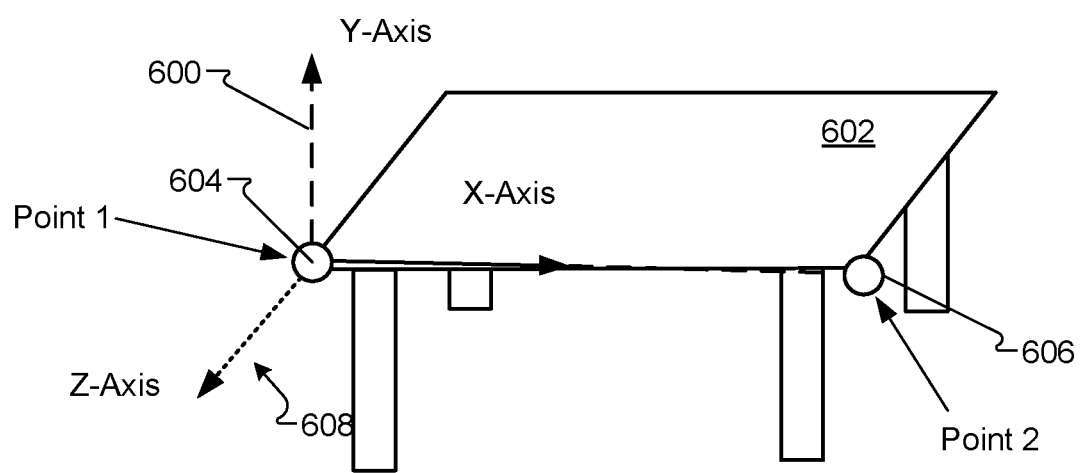
FIGS. 6A-6B are diagram depicting an example of determining a shared reference frame.
Figure 6B:
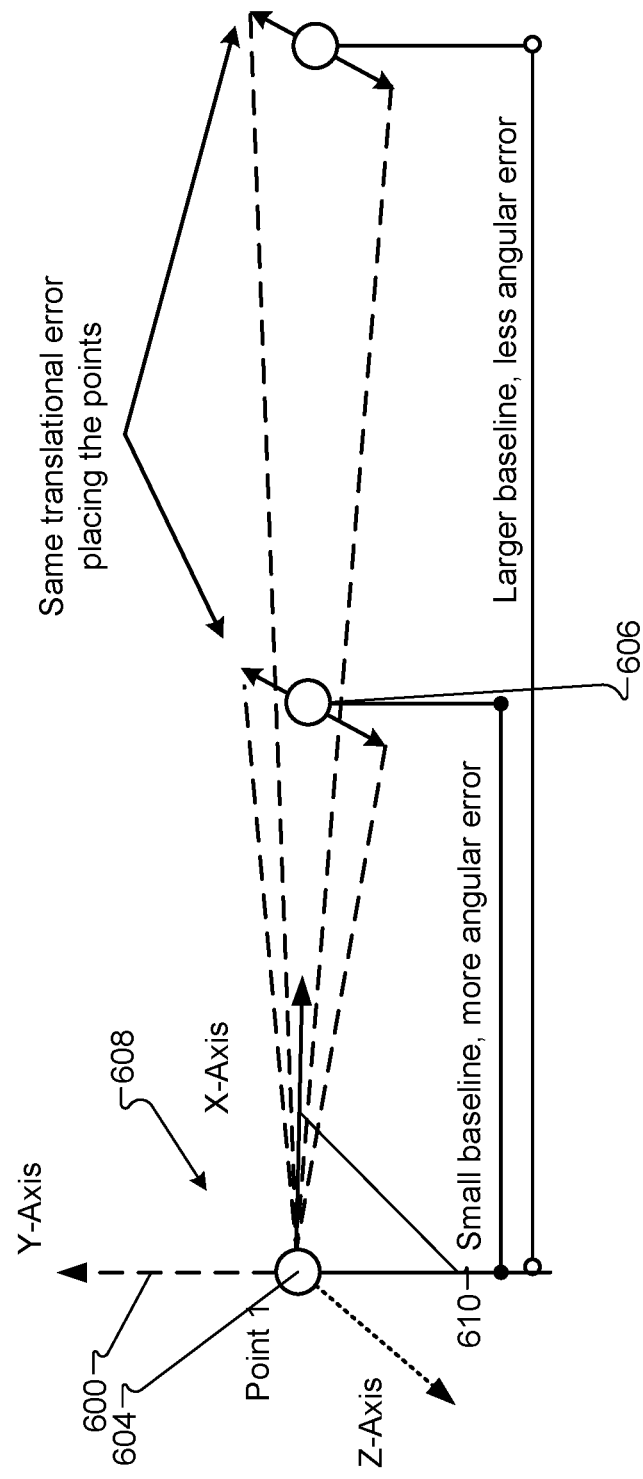

FIGS. 6A-6B are diagram depicting an example of determining a shared reference frame. In one example, determining a shared reference may be based on using two points (e.g., locations) and an up vector. In such a method, the users wishing to share a reference frame in an AR environment, for example, may mutually agree upon two points in space that will be used to define the shared reference frame. This constrains the frame to 5 degrees of freedom. The remaining constraint may include an assumption that a Y-axis 600 of the shared frame is "up" relative to gravity, which each device may detect independently.

In one example of using two locations and a vector may include having users agree to use at least two points in space (e.g., features on the floor, corners of a table, locations on a wall). For example, if the agreed upon playing area is a table 602, the users may agree upon location 604 and location 606. Then, the systems described herein may use the device pose of each device to set the locations. For example, device 106 can capture a view of the table and the user may select upon location 604, as shown in device 106. Similarly, the user may select upon location 606 to define a second location.

Each user may move a respective computing device to the first location and confirm. Each user may then move the respective computing device to select a second location and confirm the selection. Upon selecting both locations 604 and 606, a reference frame 608 may be provided to any user that performed the selections.

Such a method may avoid using depth sensing and plane detection providing an advantage of a rapid configuration of a shared reference plane without computationally heavy algorithms.

In another example, a depth and/or plane detection may be used to raycast the two locations from a distance. This may provide an advantage of allowing users to be much further away from selected locations while still enabling a way to configure a shareable reference plane.

For the methods described above, the orientation of the shared frame is well defined by the up vector 600 and the vector 610 between the two points, as shown in FIG. 6B. The accuracy of the orientation of the shared reference frame 608 may increase as the two locations are selected farther apart. If the users are accessing the AR environment 100 using a table as a physical object in which to base the shared reference frame, then two corners of the table may provide accurate orientation information for each device. However, if the users are utilizing an entire room for placing and interacting with objects, the orientation accuracy may be increased by selecting two locations that are located on a left and right side of the room, for example.

In another example, three points in space (non-collinear) may be used to generate and provide a shared reference frame amongst users accessing an AR environment. Such a method may be similar to the definition of the two locations described above, but includes the addition of selecting a third location in space. Utilizing a third location may provide an advantage that enables computing devices accessing AR environment 100 to define a shared frame that has any arbitrary orientation. For example, the Y-axis may be pointed other directions instead of upward.

In some implementations, a single location and two directions may be defined to utilize the raycast to define the first location and a second location may be automatically defined by a position associated with the computing device that defined the first location. The position may be captured at the same point in time as the first location is defined (e.g., selected). Such a method provides a second implied direction, by projecting the automatically defined second location into the horizontal plane containing the first location, for example.

In some implementations, the accuracy of the shared frame can be verified by each device. For example, users accessing the AR environment 100 may agree on one or more additional physical points and specify these verification points using any means described above. With perfect alignment, each of the verification points would have the same position in the shared reference frame. To estimate error, the computing devices can calculate a difference metric for the positions of the verification points.

In some implementations, the systems and methods described herein may provide user interface assistance for selecting objects and locations. For example, manual raycasting may be provided to allow a user to use a computing device to cast a ray that intersects with the desired location on a plane (or other detected geometry) in a scene. For example, an on-screen cursor may be used with a computing device. The on-screen cursor may designate one or more locations in the scene. A control may be provided for the user to confirm the designated location(s). In another example, a user may be prompted to select a point of interest in a camera image displayed on the computing device. Upon selecting the point of interest, one or more locations may be automatically determined or detected for use in generating a shareable reference frame.

In another example, assisted raycasting may be provided. In this example, the computing device may assist the user with the use of image processing to snap a cursor to an edge or corner in a two dimensional image. This may reduce error introduced by an unsteady hand or error introduced by a wrong selection on the screen.

In another example, AR marker detection may be used. For example, various types of AR markers may be used to remove the request to select or confirm a selected location. The systems described herein may detect the marker. Two markers separated by a baseline may be used to provide the benefits of the two locations and an up vector method described herein.

In some implementations, an identifier (ID) embedded in each AR marker can eliminate ambiguity in determining which location represents the first selected location. In such an example, users may scan each AR marker to be provided the shared reference frame allowing such users to join the AR environment with an accurate reference frame with respect to the other users accessing the AR environment.

Figure 7:
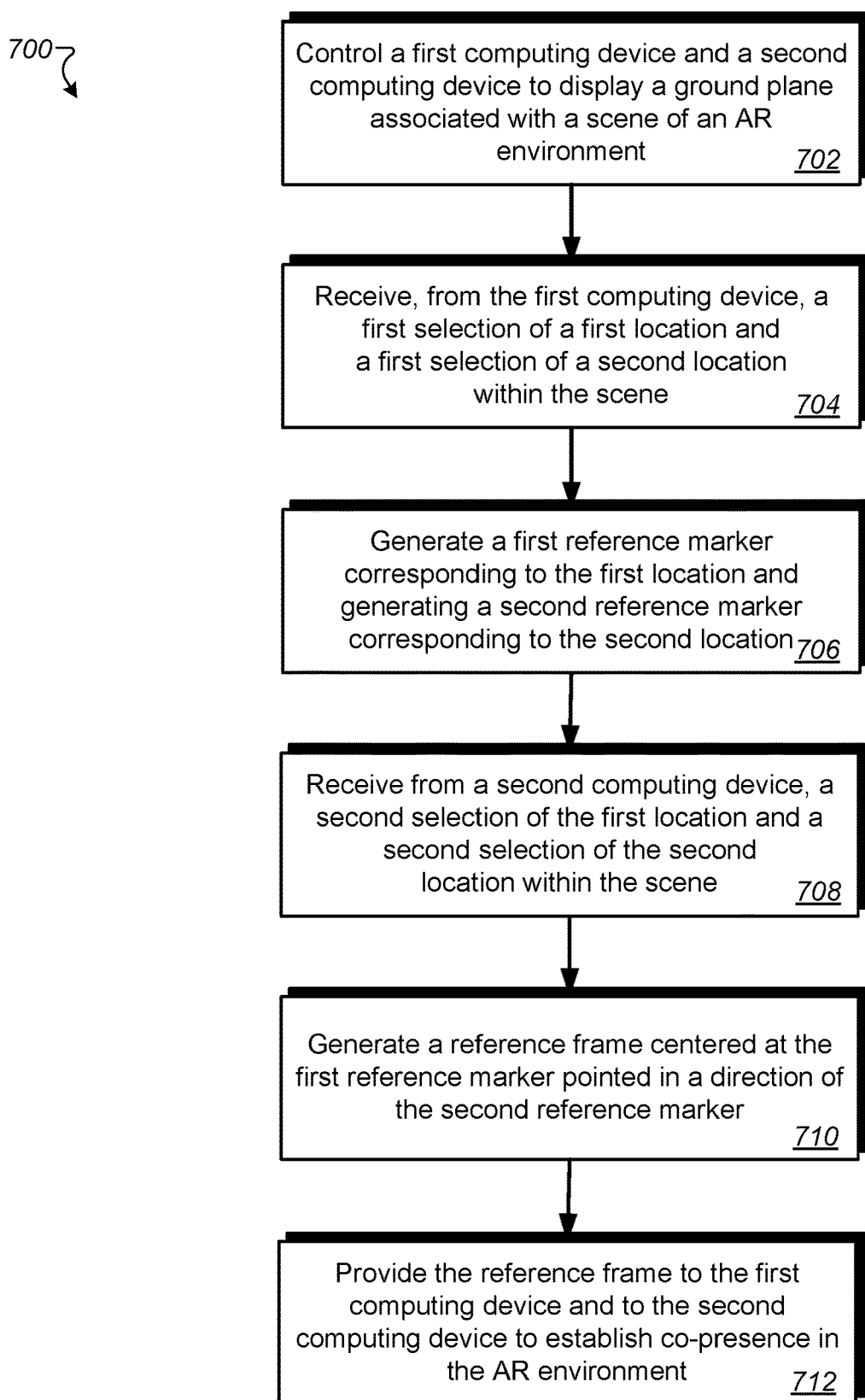
FIG. 7 is a flow chart diagramming one embodiment of a process to provide and maintain co-presence for multiple users accessing an AR environment.

FIG. 7 is a flow chart diagramming one embodiment of a process 700 to provide and maintain co-presence for multiple users accessing an AR environment. For example, process 700 may provide a reference frame amongst users (e.g., using computing device 106 and computing device 114 in the AR environment 100. The process 700 is described with reference to FIGS. 1 and 2. Users 102 and 110 may wish to share an AR environment 100 and may be prompted to begin the process 700, which may be used to generate a shared reference frame 124. One or both reference frame generators 206A or 206B may operate together to determine and generate a shareable reference frame for user 106 and user 114.

At block 702, the process 700 may represent a computer-implemented method that includes controlling a first computing device and a second computing device to display a plane associated with a scene of the augmented reality environment generated for a physical space. For example, the first user 102 may be accessing the computing device 106 and may be provided, in the screen of the computing device, a plane 116 defining a plane in a scene captured within device 106, for example. In addition, the same plane 116 can be provided to the second user 110 accessing the second computing device 114. The plane 116 may be provided in the screen of device 114.

At block 704, the process 700 may include receiving, from the first computing device, a first selection of a first location within the scene and a first selection of a second location within the scene. For example, the first computing device 102 may select a first location 120 and a second location 122. In some implementations, a user utilizes device 102 to manually select first location 120 and second location 122.

At block 706, the process 700 may include generating a first reference marker corresponding to the first location and generating a second reference marker corresponding to the second location. For example, device 106 may populate indicators within a user interface to provide feedback to the user about the locations in which the user selected.

At block 708, the process 700 may include receiving, from a second computing device, a second selection of the first location within the scene and a second selection of the second location within the scene. For example, computing device 114 may provide the scene in a user interface displayed on the screen. User 110 may select the first location (e.g., location 120) and the second location (e.g., location 122).

At block 710, the process 700 may include generating a reference frame centered at the first reference marker pointed in a direction of the second reference marker. For example, the reference frame generator 206A may generate a reference frame 124, as shown in FIG. 1. In another example, a reference frame generator 206 in AR/VR server 202 may instead generate the reference frame. In some implementations, the reference frame may be generated using the plane (e.g., a ground plane), the first location, and the second location. For example, using the two locations and one direction described above may be used to generate the reference frame 124. In some implementations, the reference frame may be generated centered at the second reference marker pointed in the direction of the first reference marker.

At block 712, the process 700 may include providing the reference frame to the first computing device and to the second computing device to establish co-presence in the AR environment. For example, computing device 106 may share the reference frame 124 with computing device 114. In some implementations, a co-presence synchronization provided by the reference frame 124 may include generating, for the scene, a registration of the first computing device 106 relative to the second computing device 114. In some implementations, the reference frame 124 is generated based on a detected pose associated with the first computing device 106 that selected the first location 120 and the second location 122.

In some implementations, the process 700 may include providing the reference frame 124 to a third computing device to establish co-presence in the augmented reality environment, in response to receiving a third selection of the first location 120 and a third selection of the second location 122 from a third computing device.

In some implementations, the co-presence may include generating, for the scene a registration of the third computing device relative to the first computing device and a registration of the third computing device relative to the second computing device. In some implementations, the method 700 may include receiving, at the second computing device 114, a selection of the first location 120 within the scene and a selection of the second location 122 within the scene includes automatically detecting, by the second computing device 114, the first reference marker and the second reference marker shown respectively at location 120 and 122.

In some implementations, the process 700 may include receiving, at the first computing device, a selection of a first location within the scene and a selection of a second location within the scene is triggered by prompts received at a display device associated with the first computing device. Example prompts are depicted in FIGS. 5A-5B.

In some implementations, the established co-presence is used to access a game in the AR environment and a game/application state 115A or 115B is stored with the reference frame and re-establishing the reference frame includes the first computing device, the second computing device, or another computing device selecting upon the first location and the second location to gain access to the game according to the stored game/application state.

In some implementation, the method 700 includes receiving, from a third computing device, a selection upon the first location and the second location provides access to the game according to the stored state. For example, a third device 422 may provide a selected first location and second location after users 402 and 404 are engaged in the AR environment 100. The third device 422 may be provided the state 215A, for example, along with the reference frame 316. The state 215A and the reference frame 316 may allow the user to access content in the AR environment 100 to view and interact with a state of the game being played by users 402 and 404.

The systems and methods described herein can enable co-presence (e.g., multiplayer) AR experiences. The methods described herein may be implemented on top of (or in addition to) one or more motion-tracking application programming interfaces. In some implementations, additional image processing (e.g., corner or marker detection) can be used. In some implementations, the users may be provided user interface guidance to manually designate physical features that uniquely define a particular shared space. That is, an application utilized by one or more users may assume the shared reference frame is aligned for all users based on the users selecting the two location points, as described throughout this disclosure.

Figure 8:
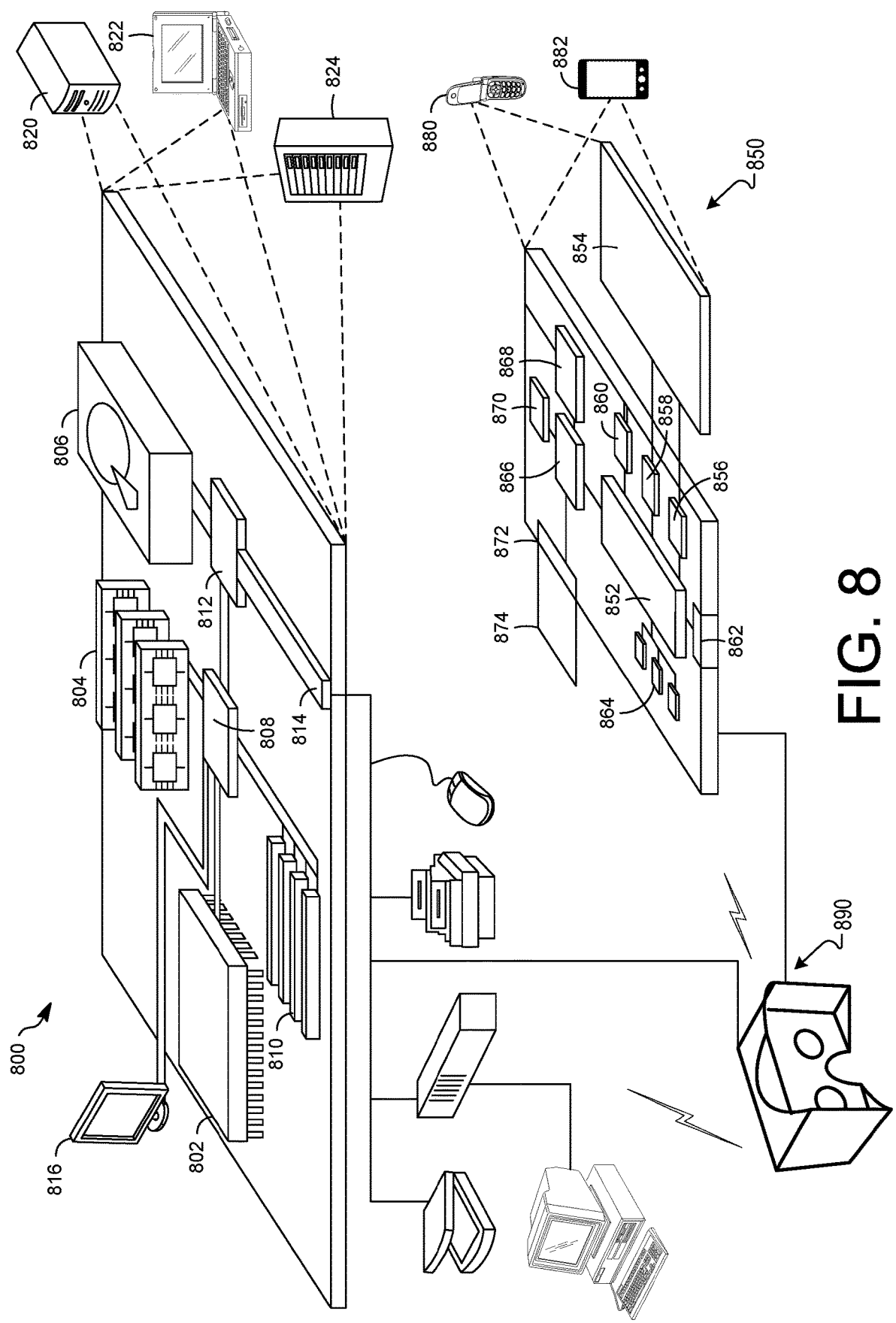
FIG. 8 illustrates an example of a computer device and a mobile computer device that can be used to implement the techniques described herein.

FIG. 8 shows an example of an example computer device 800 and an example mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In addition, the term "module" may include software and/or hardware.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for providing co-presence in an augmented reality environment, the method comprising:

controlling a first computing device and a second computing device to detect at least one plane associated with a scene of the augmented reality environment generated for a physical space;

receiving, from the first computing device, a first selection of a first location within the scene and a first selection of a second location within the scene;

generating a first reference marker corresponding to the first location and generating a second reference marker corresponding to the second location;

receiving, from a second computing device, a second selection of the first location within the scene and a second selection of the second location within the scene;

generating a reference frame centered at the first reference marker that indicates a direction toward the second reference marker, the reference frame being generated using the at least one plane, the first location, and the second location; and providing the reference frame to the first computing device and to the second computing device to establish co-presence in the augmented reality environment, establishing the co-presence including generating, for the scene, a registration of the first computing device relative to the second computing device.

2. The computer-implemented method of claim 1, wherein the reference frame is generated based on a detected pose associated with the first computing device that selected the first location and the second location and a determined intersection between the second location and the detected plane.

3. The computer-implemented method of claim 1, further comprising:

in response to receiving a third selection of the first location and a third selection of the second location from a third computing device, providing the reference frame to the third computing device to establish co-presence in the augmented reality environment, establishing the co-presence including generating, for the scene:

a registration of the third computing device relative to the first computing device; and a registration of the third computing device relative to the second computing device.

4. The computer-implemented method of claim 1, wherein receiving, at a second computing device, a selection of the first location within the scene and a selection of the second location within the scene includes automatically detecting, at the second computing device, the first reference marker and the second reference marker.

5. The computer-implemented method of claim 1, further comprising:

displaying in the first computing device the first reference marker corresponding to the first location and displaying in the first computing device, the second reference marker corresponding to the second location, and wherein receiving, at the first computing device, a selection of a first location within the scene and a selection of a second location within the scene is triggered by prompts received at a display device associated with the first computing device.

6. The computer-implemented method of claim 1, wherein the established co-presence is used to access an application in the augmented reality environment and an application state is stored with the reference frame; and re-establishing the reference frame includes the first computing device, the second computing device, or another computing device selecting upon the first location and the second location to gain access to the application according to the stored application state.

7. The method of claim 1, wherein the first reference marker and the second reference marker define at least a portion of the reference frame with five degrees of freedom and wherein an angle generated by the indicated direction and the at least one plane define a sixth degree of freedom for the reference frame.

8. The computer-implemented method of claim 1, wherein the first location represents a first physical feature in the physical environment and the second location represents a second physical feature in the physical environment, the first physical feature and the second physical feature being agreed upon between a user associated with the first computing device and a user associated with the second computing device.

9. The computer-implemented method of claim 1, wherein the co-presence is established without using position data associated with the first computing device or the second computing device.

10. A computer program product tangibly embodied on a non-transitory computer-readable storage medium and comprising instructions that, when executed by at least one computing device, are configured to cause the at least one computing device to:
controlling a first computing device and a second computing device to detect at least one plane associated with a scene of an augmented reality environment generated for a physical space;
receive, at the first computing device, a selection of a first location within the scene and a selection of a second location within the scene;
generate a first reference marker corresponding to the first location and generating a second reference marker corresponding to the second location;
generate a reference frame centered at the first reference marker pointed in a direction of the second reference marker, the reference frame being generated based at least in part on the at least one plane, the first location, and the second location; and
provide the reference frame to the first computing device and to the second computing device to establish co-presence in the augmented reality environment.

11. The computer program product of claim 10, wherein the computing device is further caused to receive, at a second computing device, a selection of the first location within the scene and a selection of the second location within the scene.

12. The computer program product of claim 10, wherein the reference frame is used to re-establish the co-presence between the first computing device and the second computing device, in response to losing a connection to augmented reality environment.

13. The computer program product of claim 10, wherein the reference frame is used to re-establish the co-presence between the first computing device and the second computing device, in response to changing the location of the physical space associated with the augmented reality environment.

14. A system comprising:
at least one processor;
memory storing instructions that, when executed by the at least one processor, cause the system to perform operations including,
controlling a first computing device and a second computing device to detect at least one plane associated with a scene of an augmented reality environment generated for a physical space;
receiving, at the first computing device, a selection of a first location within the scene and a selection of a second location within the scene;
generating a first reference marker corresponding to the first location and generating a second reference marker corresponding to the second location;
receiving, at a second computing device, a selection of the first location within the scene and a selection of the second location within the scene;
generating a reference frame centered at the first reference marker pointed in a direction of the second reference marker, the reference frame being generated using the at least one plane, the first location, and the second location; and
providing the reference frame to the first computing device and to the second computing device to establish co-presence in the augmented reality environment, the co-presence including generating, for the scene, a registration of the first computing device relative to the second computing device.

15. The system of claim 14, wherein the reference frame is generated based on information associated with the first computing device that selected the first location and the second location and a determined intersection between the second location and the detected plane.

16. The system of claim 14, further comprising:
in response to receiving a selection of the first location and a selection of the second location from a third computing device, providing the reference frame to the third computing device to establish co-presence in the augmented reality environment, the co-presence including generating, for the scene:
a registration of the third computing device relative to the first computing device; and
a registration of the third computing device relative to the second computing device.

17. The system of claim 14, wherein receiving, at the first computing device, a selection of a first location within the scene and a selection of a second location within the scene is triggered by prompts received at a display device associated with the first computing device.

18. The system of claim 14, wherein the established co-presence is used to access an application in the augmented reality environment and a state is stored with the reference frame; and
re-establishing the reference frame includes the first computing device, the second computing device, or another computing device selecting upon the first location and the second location to gain access to the application according to the stored state.

19. The system of claim 14, wherein the first location represents a first physical feature in the physical environment and the second location represents a second physical feature in the physical environment, the first physical feature and the second physical feature being agreed upon between a user associated with the first computing device and a user associated with the second computing device.

20. The system of claim 14, wherein the co-presence is established without using position data associated with the first computing device or the second computing device.

* * * * *